April 28, 1942.    L. C. PACKER    2,280,971
LOW-STARTING-CURRENT MOTOR
Filed March 7, 1940

WITNESSES:
N. F. Susser.
Nw. C. Groome

INVENTOR
Lewis C. Packer.
BY O. B. Buchanan
ATTORNEY

Patented Apr. 28, 1942

2,280,971

UNITED STATES PATENT OFFICE 2,280,971

LOW-STARTING-CURRENT MOTOR

Lewis C. Packer, Longmeadow, Mass., assignor to Westinghouse Electric & Manufacturing Company, East Pittsburgh, Pa., a corporation of Pennsylvania Application March 7, 1940, Serial No. 322,778

4 Claims. (Cl. 172—279)

My invention relates to single-phase self-starting motors, and particularly to motors of the larger size-ranges which can be utilized on a domestic lighting-circuit.

The principal object of my invention is to provide a novel three-winding motor, and a starting-connection therefor, which has an unusually high pull-out torque, under running conditions, while having a low starting-current, under starting conditions. For example, a three-quarter horsepower single-phase capacitor-motor, operating on a 110-volt line, and having a much higher pull-out torque than the usual three-quarter horsepower single-phase motor for domestic purposes, will draw a starting current of about 60 amperes, if started on its usual running-connections, and this current is several times larger than the carrying-capacity of the usual sizes of fuses for household circuits, besides seriously reducing the line-voltage and diminishing the intensity of the lights which are energized from the same circuit. According to my invention, such a motor can be started on a starting current of from 12 to 14 amperes, which is quite satisfactory. Such motors are utilized for driving compressors in refrigeration and air-conditioning units.

More specifically, it is an object of my invention to provide a capacitor-motor having two main windings and one quadrature-related capacitor-winding, with connections for starting the motor with the two main windings connected in series, and with the capacitor-winding connected across one of the main windings, with a serially connected capacitor, and causing the motor to run with the two main windings connected in parallel, and with a reduced value of capacity in the capacitor-winding circuit.

Figure 1:
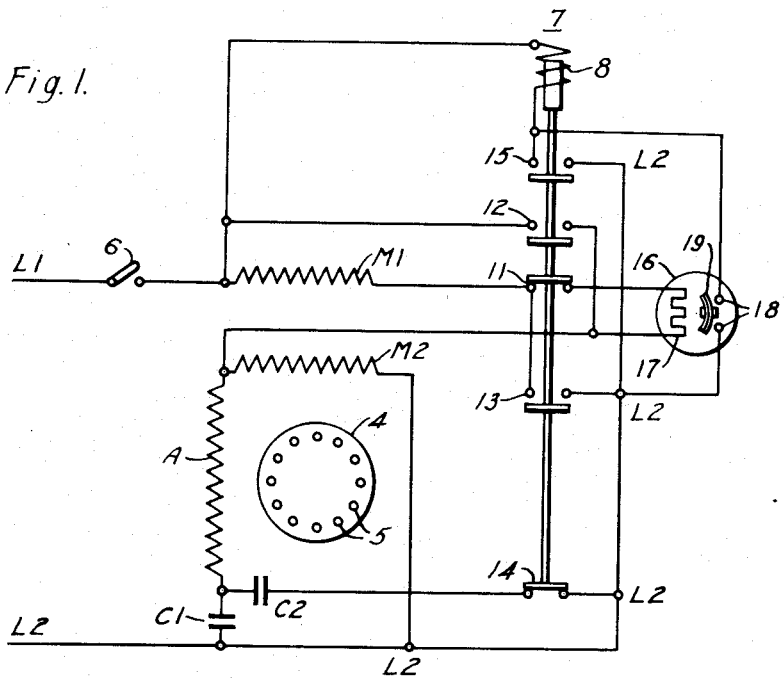
Figure 2:
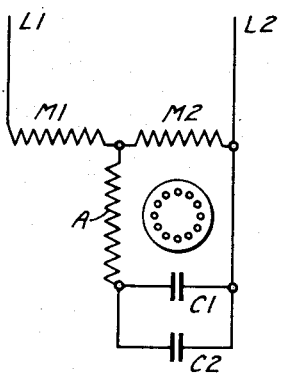
Figure 3:
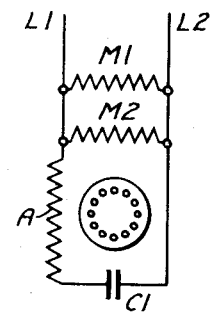

With the foregoing and other objects in view, my invention consists in the apparatus, combinations, systems, circuits and methods hereinafter described and claimed, and illustrated in the accompanying drawing, wherein Figure 1 is a diagrammatic view of my motor and the starting and running combination therefor, while Figs. 2 and 3 are diagrammatic views showing the starting and running connections, respectively.

The illustrated motor is a single-phase induction motor having a primary or stationary member provided with two main windings MI and M2, which may, or may not, be wound so that each of the windings has a portion thereof on each of the poles of the motor. The primary winding is also provided with a spatially displaced, preferably quadrature-related, auxiliary or capacitor-winding A. Cooperating with the primary member carrying the windings MI, M2 and A, there is a rotor or secondary member 4, preferably of a type having squirrel-cage windings 5. Electrically connected to the auxiliary winding A, are two capacitors CI and C2, one or both of which may be included in the auxiliary-winding circuit.

In accordance with my invention, means are provided for starting the motor with the two main windings MI and M2 connected in series, and with the auxiliary winding A connected across only the main winding M2, with both of the capacitors CI and C2 in series with the auxiliary winding A, as shown in Fig. 2; while, for running conditions, the motor is connected with all three windings connected in parallel across the line, and with only the capacitor CI included in the auxiliary-winding circuit, as shown in Fig. 3.

In Fig. 1, I have shown a particular control-means for effecting the change-over in the motor-connections after the motor has come up to speed, or after the motor has had time to reach the maximum steady-state speed which it is capable of reaching, on the starting-connections. The initial starting-operation is controlled by means of a line-switch 6, which may be either a hand-operated switch or an automatic switch such as a thermostat-switch. For controlling the connections, I also show a relay 7 having an operating coil 8, and five contacts 11, 12, 13, 14 and 15. The contacts 11 and 14 are closed when the relay 7 is deenergized, while the other contacts are open. I also show a time-delay switch, in the form of a thermal relay 16 having a heater 17 and make-contacts 18 which are open when the bimetallic thermal-element 19 is cold.

In operation, when the line-switch 6 is closed, power is supplied, from the single-phase line-conductors LI and L2, to the main windings MI and M2 in series, through a circuit comprising the main winding MI, the relay back-contact 11, the thermostat-heater 17, and the main winding M2. The auxiliary winding A is shunted across the main winding M2 with the capacitor CI permanently connected in series with the auxiliary winding A, and with the capacitor C2 connected, through the relay back-contact 14, in parallel with the capacitor CI. This constitutes the starting-connection, and the motor thereupon starts, achieving a speed somewhat below its synchronous speed in a very brief time, of the order of a second or less.

For motor-applications where the motor-load is a fan or where there is a compressor with an unloader, the starting-duty is relatively light, which is one of the reasons why I am able to start the motor on half voltage (because the two main windings are in series), notwithstanding the fact that I utilize a low-resistance squirrel-cage winding 5, or, in general, a low-resistance polyaxially short-circuited secondary winding 5, the latter being desirable in order to give the motor a high pull-out torque during normal running conditions. Also, the effective resistance of the secondary winding on the series-circuit starting-connections is four times the effective secondary resistance during the running-connections, which offsets the deleterious effect, of half-voltage operation, on the motor-torque during the starting-conditions.

In the illustrated embodiment of my invention, I utilize a time-delay means which permits the motor to continue to run on its starting connections for a few seconds after it has reached the highest speed which it is capable of attaining with these connections under any given load-condition, although I could utilize means responsive to the speed or the current, for controlling the change-over from starting to running conditions, in a manner which will be well understood by those skilled in the art. I prefer, for several reasons, however, to utilize a current-responsive thermal relay 16 for initiating the making of the change-over connections, some of these reasons being, that the thermal relay is very inexpensive and of proven reliability, that it permits the motor to achieve the highest speed which is possible, on the starting-connections, notwithstanding the fact that varying load-conditions and varying line-voltages may cause certain changes in the speed and current of the motor, and that the thermal relay 16 may readily be connected so as to be self-resetting, ready for another starting-operation, as will be subsequently described.

In a particular form of embodiment of my invention, which I have successfully utilized, the thermal-relay heater 17, which carries the line-current flowing during the continuance of the starting-connections, heats the bimetal member 19 to the point where it will bridge its contacts 18, in a time of the order of 6 or 7 seconds, under various operating conditions. The closure of the thermal-relay contacts 18 completes a circuit from the line-conductor L2 through the relay-coil 8, to the line-conductor L1. In the illustrated form of embodiment of my invention, the relay-coil 8 instantly, or very quickly, actuates the change-over switch or relay 7, although it should be understood that the time-delay element, in the more general aspects of my invention, could be embodied in either one or both of the relays 16 and 7, the important consideration, so far as motor-response is concerned, being that a certain ultimate time delay is achieved somehow, between the two relays.

When the change-over relay 7 operates, I prefer that it should open its back-contact 11 before closing either one of its make-contacts 12 or 13, although it would be quite satisfactory for one, but not both, of these make-contacts 12 and 13 to close a moment prior to the final interruption of the arc at the back-contact 11. The opening of the back-contact 11 momentarily disconnects the motor from the line L1—L2. When the make-contact 12 closes, it connects the second main winding M2 and the auxiliary winding A, in parallel with each other, directly across the line L1—L2, by connecting the common junction-point of these two windings through the relay-contact 12 to the line-conductor L1. When the make-contact 13 closes, it connects the other main winding M1 directly across the line L1—L2.

At any convenient moment or moments, during the pick-up operation of the change-over relay 7, the back-contact 14 is opened and the make-contact 15 is closed. The opening of the back-contact 14 disconnects the second capacitor C2 from the auxiliary-winding circuit, so that only the single capacitor C1 is thereafter connected in series with the auxiliary winding A. The closing of the make-contact 15 completes a holding-circuit from the line-conductor L2 through the relay-contact 15 to the relay-coil 8, and thence to the other line-conductor L1, thus by-passing the thermal-relay contacts 18. It will be noted that the opening of the back-contact 11 of the starting-circuit connections interrupts the current-flow through the thermal-relay heater 17, and it will be further noted that the establishment of the make-contacts 12 and 13 do not re-establish any circuit through said heater 17. The thermal relay 16 thus cools off and resets itself, so that it is thereafter caused to be instantly ready for another starting-operation, by opening its thermally controlled contacts 18.

It will be noted, however, that notwithstanding the opening of the thermal-relay contact 18, the change-over relay 7 remains energized through the holding-contact 15, so long as power is supplied to the running-connections of the motor from the single-phase line L1—L2, that is, so long as the supply-circuit is not interrupted by an opening of the line-switch 6 or any similarly connected protective device. As soon as the power supplied to the motor is interrupted, the change-over relay 7 is deenergized and, since the thermal or time-delay relay 16 is already deenergized, it will be seen that the motor-control parts are instantly available for again starting the motor as soon as power is again supplied through the line L1—L2.

While I have described my invention in a single preferred form of embodiment, I wish it to be understood that various changes may be made by those skilled in the art, by way of additions, substitutions and omissions, without departing from the essential spirit of my invention, at least in its broader aspects. I desire, therefore, that the appended claims shall be accorded the broadest construction consistent with their language and the prior art.

I claim as my invention:

1. A three-winding self-starting single-phase induction motor having relatively rotating primary and secondary members, the primary member having two main primary windings and a spatially dephased auxiliary winding, the secondary member having a low-resistance polyaxially short-circuited secondary winding, starting means including connections for starting the motor with the two main windings connected in series with each other across the single-phase supply-line, and with the auxiliary winding connected across only one of the main windings with a capacitance-means of a first value connected in series with the auxiliary winding, running means including connections for connecting all three of the primary windings in parallel across the single-phase supply line, with a capacitance of a value smaller than said first value connected in the auxiliary-winding circuit, and change-over means for changing from the starting connections to the running connections, said change-over means being a time-delay means automatically operative after a predetermined time-delay after the initiation of the starting-connection.

2. A three-winding self-starting single-phase induction motor having relatively rotating primary and secondary members, the primary member having two main primary windings and a spatially dephased auxiliary winding, the secondary member having a low-resistance polyaxially short-circuited secondary winding, starting means including connections for starting the motor with the two main windings connected in series with each other across the single-phase supply-line, and with the auxiliary winding connected across only one of the main windings with a capacitance-means of a first value connected in series with the auxiliary winding, running means including connections for connecting all three of the primary windings in parallel across the single-phase supply line, with a capacitance of a value smaller than said first value connected in the auxiliary-winding circuit, and change-over means for changing from the starting connections to the running connections, said change-over means including a current-responsive thermal means responsive to a current in the starting-connections, and means responsive to the thermal means for establishing and independently maintaining the running-connections.

3. A three-winding self-starting single-phase induction motor having relatively rotating primary and secondary members, the primary member having two main primary windings and a spatially dephased auxiliary winding, the secondary member having a low-resistance polyaxially short-circuited secondary winding, starting means including connections for starting the motor with the two main windings connected in series with each other across the single-phase supply-line, and with the auxiliary winding connected across only one of the main windings with a capacitance-means of a first value connected in series with the auxiliary winding, running means including connections for connecting all three of the primary windings in parallel across the single-phase supply line, with a capacitance of a value smaller than said first value connected in the auxiliary-winding circuit, and change-over means for changing from the starting connections to the running connections, said change-over means including a current-responsive thermal means responsive to a current in the starting-connections, and means responsive to the thermal means for establishing the running-connections, for deenergizing the thermal means, and for thereafter maintaining the running-connections so long as, and only so log as, the motor remains energized from said single-phase supply-line.

4. A three-winding self-starting single-phase induction motor having relatively rotating primary and secondary members, the primary member having two main primary windings and a spatially dephased auxiliary winding, the secondary member having a polyaxially short-circuited secondary winding, starting means including connections for starting the motor with the two main windings connected in series with each other across the single-phase supply line, and with the auxiliary winding connected across only one of the main windings with the capacitance-means connected in series with the auxiliary winding, running means including connections for connecting all three of the primary windings in parallel across the single-phase supply line, with a capacitance-means connected in the auxiliary-winding circuit, a current-responsive control-means included in a circuit-conductor which is energized when the starting connections are made but not when the running-connections are made, an electrically energized control-means responsive to a response of said first-mentioned control-means for changing from the starting connections to the running-connections, at least one of said control means having a sufficiently sluggish action so that, between them, a sufficient starting-time is provided for the motor, and means for thereafter maintaining the electrical energization of the second-mentioned control-means so long as, and only so long as, the motor remains energized from said single-phase supply-line.

LEWIS C. PACKER.